Dec. 17, 1963 MICHIYUKI UENOHARA 3,114,881

MICROWAVE HETERODYNE RECEIVER

Filed March 17, 1960 2 Sheets-Sheet 1

INVENTOR
M. UENOHARA
BY
Sylvan Sherman
ATTORNEY

Dec. 17, 1963 MICHIYUKI UENOHARA 3,114,881

MICROWAVE HETERODYNE RECEIVER

Filed March 17, 1960 2 Sheets-Sheet 2

INVENTOR
M. UENOHARA
BY
Sylvan Sherman
ATTORNEY

United States Patent Office 3,114,881

Patented Dec. 17, 1963

3,114,881
MICROWAVE HETERODYNE RECEIVER

Michiyuki Uenohara, Murray Hill, N.J., assignor to Bell Telephone Laboratories, Incorporated, New York, N.Y., a corporation of New York Filed Mar. 17, 1960, Ser. No. 15,764
8 Claims. (Cl. 325—491)

This invention relates to superheterodyne radio receivers and components thereof, and in particular to receivers of the type using a parametric amplifier as a combination high frequency amplifier and local oscillator.

Recent scientific discoveries in the solid state field have led to advances in the design and development of low-noise radio receivers. Present intensive technical activity and widespread interest in the receiver field is readily understandable, since lower noise in the amplification process leads to important improvements and economies in communication systems. The smaller the noise contribution of the amplifier, the more favorable is the resulting signal-to-noise ratio of the amplified signal. Thus, weaker incoming signals can be amplified, and receiver sensitivity is increased. Increased sensitivity, in turn, can be used to advantage in many ways. For example, it can result in a longer distance between repeaters, or an increased total route distance of a radio-relay system. Increased sensitivity is vital to the success of various satellite communication systems now being considered. It is also of great benefit to the radio astronomer seeking to gather in extremely low intensity stellar radiation. In the military field, increased receiver sensitivity leads to improved radar performance. In cases where transmitting power has already been pushed to the limit of present technology, an increase in receiver sensitivity is the only means available for further extending the range of radar systems.

Among the solid state amplifiers currently being exploited are the variable-capacitance amplifier and the variable-inductance amplifier. The underlying principles common to both of these types of amplifiers, more generally referred to as parametric amplifiers, are discussed in a copending application of H. Suhl, Serial No. 640,464, filed February 15, 1957, now U.S. Patent No. 3,066,263, issued November 27, 1962. As explained therein, a dynamical system which is tuned to resonance at a frequency $f_p/2$ can be set into oscillations at this frequency by the introduction into it of energy at a pumping frequency $f_p$ in an amount sufficient to overcome the intrinsic losses of the system. Such a system is a type of subharmonic generator. The energy may be introduced into the system by the controlled variation of a reactive element such as a capacitor or an inductor; hence the names variable-capacitance or variable-inductance amplifier. (See "The Variable-Capacitance Parametric Amplifier," by E. D. Reed, October 1959, Bell Laboratories Record, pages 373–379.)

If, on the other hand, the injection of pumping energy is maintained below the threshold level at which sustained oscillations take place, the device acts as an amplifier at the frequency $f_p/2$.

The principle of the parametric amplifier has been extended to include a pair of resonant circuit meshes tuned to individual frequencies $f_s$ and $f_i$ instead of a single mesh. The two tuned meshes share the variable reactive element in common. In this arrangement, the energy injected is adjusted to take place at a pumping frequency $$f_p=f_s+f_i$$

Below the threshold level, the first mesh constitutes an amplifier for signal energy within a band centered on the signal frequency $f_s$ while the second mesh similarly constitutes an amplifier for wave energy within a band centered on the image, or idler, frequency $f_i$.

It is also a very important characteristic of the parametric amplifier that when a signal $f_s$, which differs in frequency from half the pump frequency, is applied to the amplifier there is produced at the output not only an amplified signal at frequency $f_s$ but an equally strong signal at the idler frequency $f_i$. The idler signal thus generated is an inevitable by-product of this type of amplification. To suppress it would also suppress the desired amplification of the applied signal.

It should also be noted that the signal wave and the idler wave differ in frequency from half the pump frequency by an equal amount, that is, $$|f_p/2-f_s|=|f_p/2-f_i|$$

Militating against the use of the parametric amplifier in a high frequency superheterodyne receiver is the necessity of including a second high frequency energy source to provide the pumping power in addition to the usual high frequency local oscillator needed to perform the heterodyning process.

It is, therefore, the broad objective of this invention to reduce the number of high frequency energy sources needed in superheterodyne receivers using high frequency parametric amplifiers.

More specifically, it is an object of this invention to simultaneously utilize a parametric amplifier as a signal amplifier and as a subharmonic generator.

In accordance with the principles of the invention, the parametric amplifier is simultaneously adjusted, in a manner to be explained in greater detail hereinafter, to function as an amplifier at the signal frequency, and as a subharmonic generator at half the pumping frequency. Specifically, in its capacity as an amplifier it is of the two-mesh variety having tuned circuits responsive to a first frequency $f_s$ equal to the signal frequency, and to a second or idler frequency $f_i$, equal to $(f_p-f_s)$.

In its capacity as a subharmonic generator it has a response at the pump subharmonic frequency $f_p/2$.

The output of the parametric amplifier thus includes energy components at frequencies $f_s$, $f_i$ and $f_p/2$. By suitably selecting the pumping frequency $f_p$ and the intermediate frequency $f_{if}$ of the receiver so that $$f_s=f_p/2-f_{if}$$

the subharmonic component of the pumping frequency can be used as the local oscillator which, when applied to the first detector, beats with both the signal and idler signals to produce the intermediate frequency signal in the usual manner.

It should be noted that the information content of a parametrically amplified signal is contained in both the signal wave and the idler wave. To convert both these signals to a common intermediate frequency in an in-phase relationship, and thereby extract the maximum information from both the signal and idler waves, requires a heterodyning signal having a particular frequency and phase relationship relative to these two signals.

It is a feature of the invention that both the frequency and the phase relationships between the signal wave and the pump subharmonic wave and between the idler wave and the pump subharmonic wave are inherently optimum so as to produce a maximum intermediate frequency output signal.

These and other objects and advantages, the nature of the present invention, and its various features, will appear more fully upon consideration of the various illustrative embodiments now to be described in detail in connection with the accompanying drawings, in which.

Figures 2, 4:
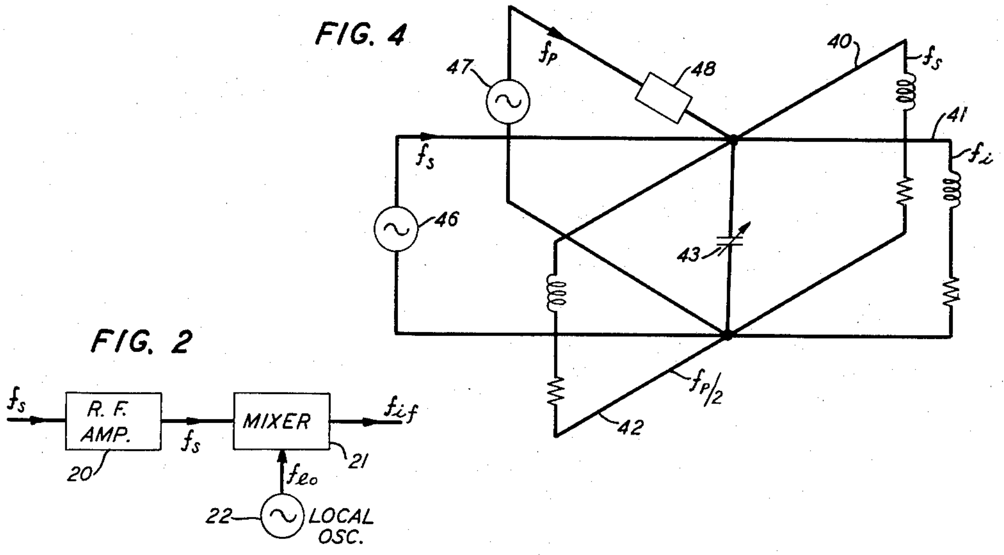
FIG. 2 is a block diagram of the prior art arrangement of radio frequency amplifier and local oscillator.
FIG. 4 is a simplified equivalent circuit of a parametric amplifier-subharmonic generator in accordance with the invention.
Figure 5:
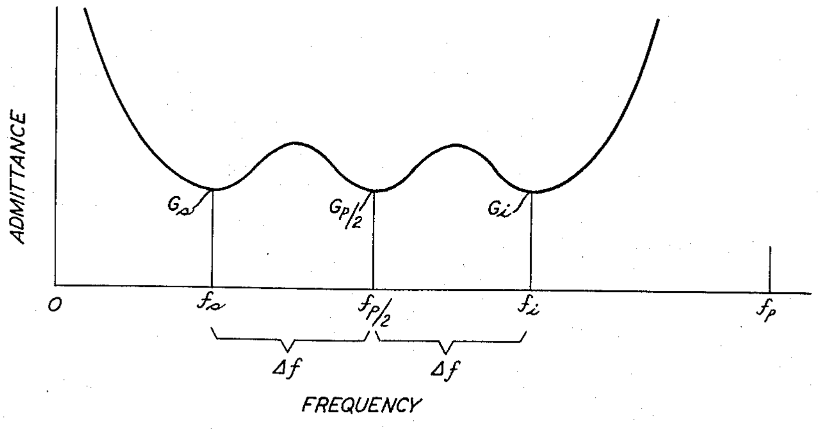
Figure 6:
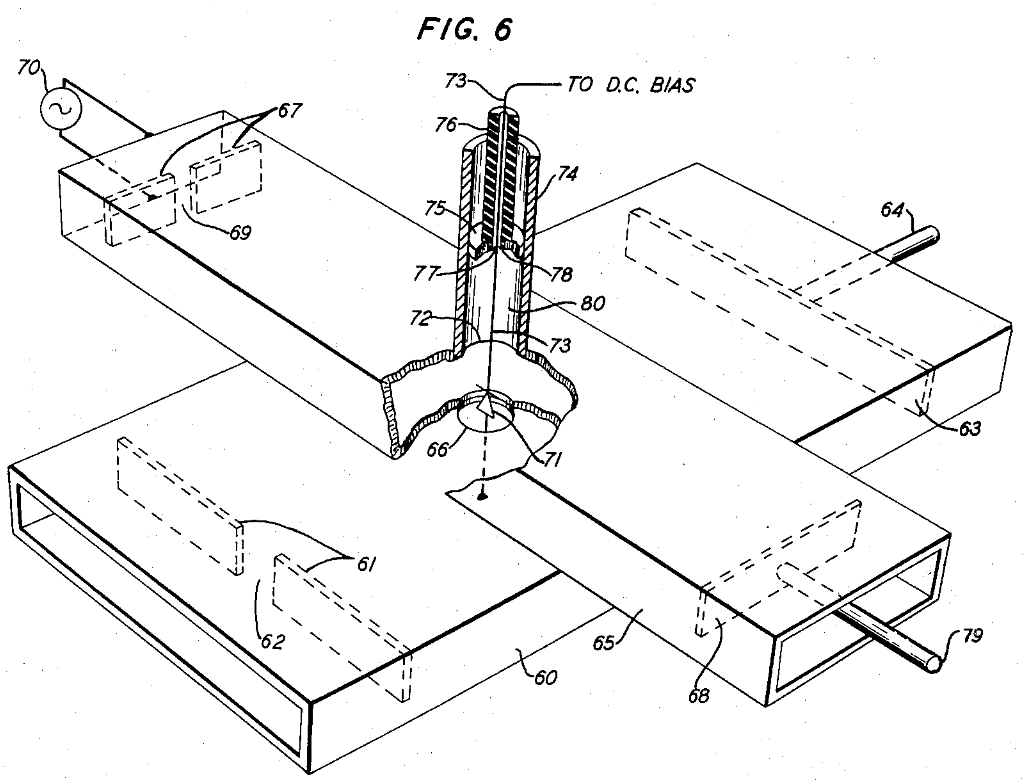

FIG. 5, given by way of explanation, shows the frequency distribution of the various signals and the admittance of the network of FIG. 4 at said frequencies; and FIG. 6 is an embodiment of the invention for use in the microwave range of frequencies.

Figure 1:
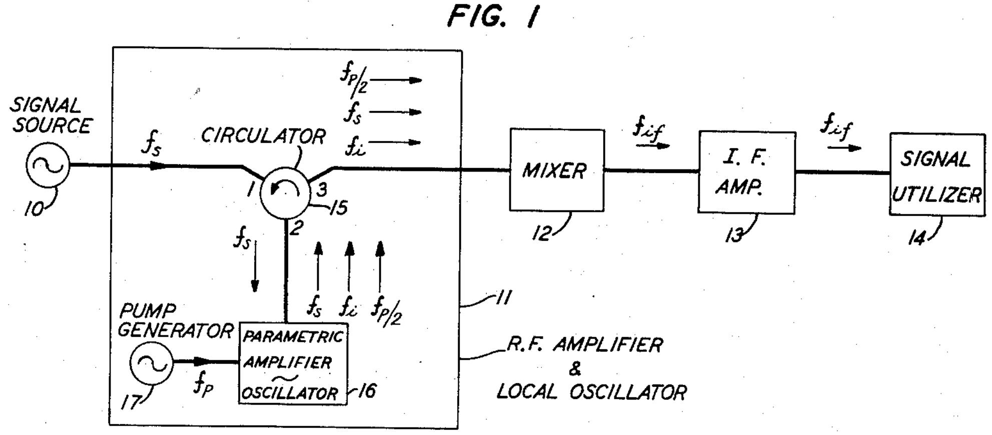
FIG. 1 is a block diagram of a superheterodyne receiver in accordance with the invention.

Referring specifically to FIG. 1, a superheterodyne radio receiver is shown connected and utilized in accordance with the principles of the invention. The receiver, shown in block diagram, comprises a signal source 10, a combination radio frequency amplifier-local oscillator, shown as a unit 11, a mixer, or first detector 12, an intermediate frequency amplifier 13 and a signal utilizer 14.

Fundamentally, the receiver operates in the conventional manner. A radio frequency signal $f_s$ of relatively low energy content as derived, for example, from a signal source such as an antenna, is applied to the radio frequency amplifier 11. In the embodiment of FIG. 1, the signal to be amplified is introduced at terminal 1 of circulator 15 and by the circulator action is guided to terminal 2. From terminal 2 it enters the parametric amplifier 16, is amplified and emerges from the parametric amplifier along with a second signal at frequency $f_i$, generally referred to as the image or idler frequency. In accordance with the invention, a third signal $f_p/2$ is also obtained from the parametric amplifier, as will be explained in greater detail hereinafter, along with the amplified signal $f_s$ and its image $f_i$. The operation of the parametric amplifier, insofar as it relates to the signal and image frequencies, is explained in the above-cited article by E. D. Reed. It is sufficient for present purposes to consider the parametric amplifier 16 as of the type using a variable reactance as the active element and a locally generated high frequency pumping signal $f_p$ as the principal energy source. In the embodiment shown in FIG. 1, the pumping energy is derived from the pump generator 17.

The three signals $f_s$, $f_i$ and $f_p/2$ obtained from the parametric amplifier are applied to terminal 2 of circulator 15 and by circulator action are guided to terminal 3 which thereby becomes the effective output terminal of unit 11. The amplified signal and idler waves, each carrying the informational content of the original signal wave, are applied to a substantially conventional mixer circuit 12 for transposition from the high frequency range at which parametric amplifiers are most efficient, to a lower frequency for further amplification in conventional amplifier circuits. Frequency transposition is effected by means of the subharmonic signal $f_p/2$ acting as the conventional heterodyning signal. Since the frequency of the pump subharmonic always lies exactly midway between the frequencies of the signal and idler waves, the difference frequency produced in the heterodyning process for each of the intelligence signals is the same, and is designated in FIG. 1 as the signal $f_{if}$ emerging from the mixer 12.

The intermediate frequency signal $f_{if}$ is applied to the intermediate frequency amplifier 13 for further amplification and hence to a utilizing circuit designated as signal utilizer 14. The latter most generally comprises a second detector for extracting the information signal and a display means which may be either visual or audio.

It is, in particular, to the radio frequency amplifier-local oscillator portion of the receiver that the present invention is directed. In the prior art superheterodyne receiver, the radio frequency amplifier and local oscillator comprised two separate and dstinct units. As shown in FIG. 2, the two units are represented by the radio frequency amplifier 20 which supplies an amplified radio frequency signal $f_s$ to the mixer 21, and a local oscillator 22 which supplies the heterodyning signal $f_{lo}$ to the mixer. In such a typical arrangement there are two high frequency active components, that is, two microwave tubes, one in the amplifier and one in the oscillator. The present tendency, however, is to replace the conventional amplifier with a low noise variable reactance amplifier. While such amplifiers have many desirable performance characteristics, one important drawback to their use has been the need of a third high frequency active element.

Figure 3:
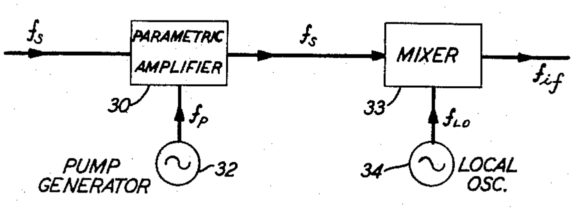
FIG. 3 is a modification of the arrangement of FIG. 2 wherein the conventional radio frequency amplifier is replaced with a parametric amplifier.

In FIG. 3 there is shown the front end of a receiver utilizing a parametric amplifier 30 in place of the conventional amplifier. As there shown, the receiver includes the parametric amplifier 30 and its associated high frequency pump generator 32. The signal $f_s$ to be amplified, and the pumping signal $f_p$ are applied to the amplifier 30. The output wave from the parametric amplifier is then applied to the mixer 33 along with the local oscillator signal $f_{lo}$, derived from a separate high frequency generator 34.

While the use of a parametric amplifier results in a substantial reduction in the noise figure of the receiver, the penalty to be paid is the need for a second high frequency, high power local signal generator. It has been discovered, however, that by suitably adjusting the parametric amplifier, the latter may be made to supply the heterodying signal directly, thus eleminating the need for a separate local oscillator. Under these conditions, the principal disadvantages to the use of a parametric amplifier in a superheterodyne receiver are eliminated.

Referring again to FIG. 1, and in particular to the details of the radio frequency amplifier-local oscillator portion 11, it will be noted that there are three signals emanating from the parametric amplifier 16. One signal, $f_s$, is the amplified replica of the input signal. The second signal, $f_i$, is the image or idler signal. Recalling that both the amplified signal and the idler signal carry the informational content of the signal wave, a substantial improvement in amplification efficiency is obtained if the idler signal can be preserved along with the signal, and the energy content of the two signals added in an in-phase relationship.

It is known that in the case of a two-mesh circuit, of which the common branch is a variable reactance and of which the individual resonant frequencies are $f_s$ and $f_i$, if energy is pumped into both meshes by variation of the common element at the rate $f_p = f_s + f_i$, each mesh becomes a negative resistance amplifier for signals of, or approximately equal to the resonant frequency of that mesh. In a variable capacitance parametric amplifier wherein the capacitance of the variable element is given by $C = C_0 + C_3 \sin(\omega_p t + \varphi_p)$, where $\omega_p$ is equal to $2\pi$ times the pump frequency $f_p$ and $\varphi_p$ is the phase of the pumping frequency, the negative conductance introduced into the signal mesh by the variable capacitance is given by $$g_s = \frac{\omega_s \omega_i C_3^2}{4G_i} \quad (1)$$

where $\omega_s$ is equal to $2\pi f_s$, $\omega_i$ is equal to $2\pi f_i$, and $G_i$ is equal to the positive conductance of the network at the idler frequency.

The gain at the signal frequency is then given by $$\text{Gain}_{(s)} = \left| \frac{G_s + g_s}{G_s - g_s} \right|^2 \quad (3)$$

Substituting for $g_s$ in (2) gives $$\text{Gain}_{(s)} = \left| \frac{G_s + \frac{(\omega_s \omega_i C_3^2)}{4G_i}}{G_s - \frac{\omega_s \omega_i C_3^2}{4G_i}} \right| \quad (3)$$

This conversion gain from signal to idler is given by $$\text{Gain}_{(s-i)} \approx \frac{\omega_i}{\omega_s}\left|\frac{G_s+g_s}{G_s-g_s}\right|^2 \qquad (4)$$

Substituting for $g_s$ in (4) gives $$\text{Gain}_{(s-i)} \approx \frac{\omega_i}{\omega_s}\left|\frac{G_s+\frac{\omega_s\omega_i C_3^2}{4G_i}}{G_s-\frac{\omega_s\omega_i C_3^2}{4G_i}}\right|^2 \qquad (5)$$

Likewise, in a single mesh circuit that is tuned to resonance at a frequency $f_p/2$ and includes a variable reactance element, if energy is pumped into the circuit by variation of this element at a rate $f_p$, the circuit becomes a negative resistance amplifier for signals of frequency $f_p/2$. The negative conductance produced at frequency $f_p/2$ in a variable capacitance amplifier is given by $$g_{p/2}=\frac{(\omega_p/2)^2C_3^2}{4G_{p/2}} \qquad (6)$$

where $\omega_p/2$ is equal to $2\pi f_p/2$ and $G_p/_2$ is equal to the positive conductance of the network at half the pump frequency.

The gain at half the pump frequency is given by $$\text{Gain}_{(p/2)}=\left|\frac{G_{p/2}+g_{p/}}{G_{p/2}-g_{p/2}}\right|^2 \qquad (7)$$

Substituting for $g_p/_2$ in (7) years $$\text{Gain}_{(p/2)}=\left|\frac{G_{p/2}+\frac{(\omega_p/2)^2C_3^2}{4G_{p/2}}}{G_{p/2}-\frac{(\omega_p/2)^2C_3^2}{4G_{p/2}}}\right|^2 \qquad (8)$$

If now the three meshes are made to have a common variable reactance, as shown in FIG. 4, the situation contemplated by the invention is obtained. In FIG. 4 there are shown three resonant meshes including mesh 40, tuned to the signal frequency $f_s$; mesh 41, tuned to the idler frequency $f_i$; and mesh 42, tuned to half the pump frequency $f_p/2$. All three meshes share the common branch including the variable capacitor 43. Energy at pumping frequency $f_p$ derived from a high frequency source 47 is introduced into the three meshes through a high pass filter 48 by varying the capacitance of the voltage sensitive capacitor 43. The signal $f_s$, derived from a signal source 46, is also applied to the three parallel-connected meshes.

In FIG. 5, the signal, idler, pump and pump subharmonic frequencies are displayed upon a frequency scale. Also shown, is the admittance characteristic of the network as seen from the signal circuit.

In accordance with the invention, the admittances $G_s$, $G_p/2$ and $G_i$ at the signal, subharmonic and idler frequencies, respectfully, are made substantially equal so that the admittance curve has three approximately equal null points. If, in addition, the signal and idler frequencies are expressed in terms of the subharmonic frequency and the difference frequency $\Delta f$, there obtains $$f_s=f_p/2-\Delta f$$
$$f_i=f_p/2+\Delta f$$

Making these substitutions in Equations 3, 6 and 8 gives $$\text{Gain}_s=\left|\frac{G^2+\pi^2C_3^2[(f_p/2)^2-\Delta f^2]}{G^2-\pi^2C_3^2[(f_p/2)^2-\Delta f^2]}\right|^2 \qquad (9)$$

$$\text{Gain}_{s-i}=\left|\frac{f_p/2+\Delta f}{f_p/2-\Delta f}\right|\left|\frac{G^2+\pi^2C_3^2[(f_p/2)^2-\Delta f^2]}{G^2-\pi^2C_3^2[(f_p/2)^2-\Delta f^2]}\right|^2 \qquad (10)$$

and $$\text{Gain}_{p/2}=\left|\frac{G^2+\pi^2C_3^2(f_p/2)^2}{G^2-\pi^2C_3^2(f_p/2)^2}\right|^2 \qquad (11)$$

where $G=G_s=G_i=G_p/_2$.

From Equations 9, 10 and 11 it can be seen that the gain for the idler frequency and the conversion gain for the idler frequency are substantially the same since, in general, $\Delta f$ is much smaller than $f_p/2$. However, the gain at the subharmonic frequency is slightly greater than that at the signal and idler frequencies. Because of this greater gain, the oscillation threshold at the subharmonic frequency is less than at the signal and idler frequencies. Consequently, as the pumping power is increased there will be a power level at which the parametric amplifier will break into oscillations at the subharmonic frequency. At this level, however, the signal and idler meshes are simultaneously in a condition of high, stable gain.

From FIG. 5 it is noted that the subharmonic frequency lies midway between the idler and signal frequencies. The difference frequency $\Delta f$ is, therefore, equal for both. If now the subharmonic oscillations are used as the local beating signal in the mixing stage, the same difference signal $\Delta f$ is produced for each of the two information bearing signals. The difference signal $\Delta f$ is therefore chosen so as to correspond to the intermediate frequency of the radio receiver. Hence, by choosing $$\Delta f=f_{if}$$

then $$|f_p/2-f_i|=|f_p/2-f_s|=|f_{if}| \qquad (12)$$

If, in addition, the phase angles of the signal, image and subharmonic waves are properly adjusted, the two intermediate frequency output signal components obtained from the mixing stage will add in phase, increasing the output power four times over that which would be obtained from the signal frequency $f_s$ alone.

Expressing the pumping wave and input signal as $$v_p=V_p \sin(2\pi f_p t+\varphi_p)$$

and $$v_s=V_s \sin(2\pi f_s t+\varphi_s)$$

where $\varphi_p$ and $\varphi_s$ are the relative phase angles of the pump and signal wave, respectfully, the image signal that is produced in the parametric amplifier is given by $$v_i=V_i \sin(2\pi f_i t+\varphi_p-\varphi_s)$$

It can then be shown that if the subharmonic signal also produced by the parametric amplifier is of the form $$v_{p/2}=V_{p/2} \sin[2\pi f_p/2+(\varphi_p)/2] \qquad (13)$$

the two intermediate frequency output signal components have the requisite in-phase relationship for maximum output from the mixing operation.

In the absence of a synchronizing signal, the subharmonic oscillation can exist in one of two distinct phase modes relative to the pumping signal. These phase modes differ by 180 degrees. One of the two phase modes is the correct one for optimum output whereas the other is not. In general, which one of the modes will be obtained is a matter of chance. In the presence of a wave at the signal frequency, however, the subharmonic self-oscillations will inherently establish themselves in the correct phase relationship for optimum output. In an amplifier-oscillator arrangement in accordance with the invention this condition is automatically established and maintained and requires no further adjustment for changes in the pumping or signal frequencies as might occur due to drifting of the pump generator or signal source.

In FIG. 6 there is shown an embodiment of a parametric amplifier-oscillator in accordance with the invention adapted for use in the microwave range of frequencies. Fundamentally, FIG. 6 shows three resonant cavities mutually coupled to each other through the medium of a voltage sensitive variable capacitance diode. The first of the three cavities, cavity 60, comprises a section of bounded electrical transmission line which may be a rectangular waveguide of the metallic shield type having a wide internal cross-sectional dimension of at least one-half wavelength of the lowest frequency energy to be supported therein and a narrow dimension substantially one-half of the wide dimension or less. For the purposes of this invention, the lowest frequency intended to be supported in cavity 60 is approximately equal to $$(f_p/2-f_{if})$$

Terminating cavity 60 at one end are the conductive septa 61, each of which extend inward from the narrow guide walls a distance less than half the guide width. Wave energy is coupled into and out of cavity 60 through the iris 62 formed by the conductive septa 61.

The other end of cavity 60 is terminated by the transverse shorting member 63 whose longitudinal position relative to iris 62 may be adjusted for tuning purposes by means of a plunger 64.

A second cavity 65, also comprising a section of rectangular waveguide, is located to cross cavity 60 with a portion of wide wall of each cavity contiguous and parallel to a portion of wide wall of the other. The cross-sectional dimensions of cavity 65 are chosen to be supportive of wave energy at the pumping frequency but to be cut off for frequencies in the range of the image and signal frequencies.

Cavity 65 is partially bounded at one end by the two conductive septa 67 to form an iris 69 therebetween, through which pump energy from a pumping source 70 is coupled into cavity 65.

The other end of cavity 65 is terminated by the transverse shorting member 68 which may be longitudinally positioned by means of a plunger 79 to tune cavity 65.

Extending through the center of the contiguous wall portions of cavities 65 and 60 is an aperture 66 in which there is supported the capacitive diode 71. One end of diode 71 extends transversely across cavity 60 and is conductively connected to the opposite or bottom wide wall of said cavity. The other end of diode 71 extends through a second aperture 72 in the upper wide wall of cavity 65 and is connected to the center conductor 73 of coaxial cable 74. Conductor 73, in turn, is connected to a source of biasing potential for adjusting the operating point about which the capacitive reactance introduced by diode 71 is varied.

Located a distance from aperture 72 is the transverse radio frequency shorting member 75 for terminating line 74 to form the coaxial cavity 80. In the embodiment of FIG. 6, member 75 is a conductive disc having a small hole 77 along its center through which conductor 73 passes. The latter, in turn, is held in place and conductively insulated from member 75 by means of an insulating bushing 78, which may either be a separate hollow cylindrical member or an extension of the dielectric plunger 76.

The position of shorting member 75 is longitudinally adjusted, for tuning purposes, by means of plunger 76.

In operation the three cavities are adjusted to produce the desired admittance response as shown in FIG. 5. It should be noted that while the transverse dimensions of cavity 65 are such as to render this cavity substantially cut off at the signal frequency, the tuning of cavity 65, nevertheless, does have an effect upon the admittance of the amplifier as viewed from the signal circuit. This is so since fields in the range of the signal and idler frequencies do exist in the pump cavity in the vicinity of diode 71.

The adjustments of the cavities in all other respects are made in accordance with practices well known in the parametric amplifier art.

In all cases it is understood that the above-described arrangements are simply illustrative of a small number of the many possible specific embodiments which can represent applications of the principles of the invention. For example, the nonlinear common reactive element may be an inductance such as is obtained by using a biased gyromagnetic element. Furthermore, the reactive element can be mounted in a nonresonant environment or be part of a transmission line which is made to interact with traveling signal and pump waves. Thus, numerous and varied other arrangements can readily be devised in accordance with these principles by those skilled in the art without departing from the spirit and scope of the invention.

What is claimed is:

1. A combination amplifier and subharmonic generator comprising a plurality of resonantly tuned circuits having a common variable reactive member, said circuits having an admittance variation with respect to frequency which has a first minimum at a first frequency $f_s$, a second minimum at a second frequency $f_i$, and a third minimum at a third frequency $f_p/2$, means for coupling a signal at frequency $f_s$ to one of said tuned circuits, means for coupling a pumping signal at a frequency $f_p$ to said common member, and means for simultaneously extracting from said tuned circuits an amplified signal at frequency $f_s$ and a subharmonic of said pumping signal at frequency $f_p/2$.

2. The combination according to claim 1 wherein said third frequency $f_p/2$ lies midway between said first frequency $f_s$ and said second frequency $f_i$.

3. In a superheterodyne receiver having a given intermediate frequency, a combination amplifier-oscillator comprising a parametric amplifier, means for applying wave energy to said amplifier at a signal frequency and at a pumping frequency, means for extracting from said amplifier-oscillator subharmonic wave energy of said pumping energy and amplified wave energy at said signal frequency, a mixing stage coupled to said amplifier-oscillator, and means for coupling said subharmonic wave energy and said amplified wave energy to said mixer for producing wave energy at said given intermediate frequency.

4. In a superheterodyne type receiver having an intermediate frequency $f_{if}$, a combination amplifier and local oscillator comprising a parametric amplifier, means for applying a signal at frequency $f_s$ and pumping energy at frequency $f_p$ to said amplifier, means for simultaneously extracting from said amplifier a subharmonic of said pumping energy at frequency $f_p/2$, an amplified signal at frequency $f_s$ and an idler signal at frequency $f_i$ where $$f_i+f_s=f_p$$

and where $f_s=f_p2-f_{if}$, a mixing stage coupled to said amplifier, and means for utilizing said subharmonic frequency for mixing with said idler frequency and said signal frequency to produce said intermediate frequency $f_{if}$.

5. In a superheterodyne receiver having an intermediate frequency $f_{if}$, a combination amplifier and subharmonic generator comprising a plurality of resonantly tuned circuits having a common variable reactive member, said circuits having an admittance variation with respect to frequency which has a first minimum at a frequency $f_s$, a second minimum at a frequency $f_p/2$, and a third minimum at a frequency $f_i$, means for applying a signal at frequency $f_s$ and pumping energy at frequency $f_p$ to said common member, means for simultaneously extracting from said circuits an amplified signal at frequency $f_s$, an idler signal at frequency $f_i$ and a subharmonic of said pumping energy at frequency $f_p/2$ where $f_i+f_s=f_p$ and $f_s=f_p/2-f_{if}$, a mixing stage coupled to said amplifier, and means for utilizing said subharmonic frequency for mixing said idler frequency and said signal frequency to produce said intermediate frequency $f_{if}$.

6. The combination according to claim 5 wherein the admittances at said first, second and third minima are substantially the same.

7. The combination according to claim 1 wherein said variable reactive member is a variable-capacitance diode.

8. The combination according to claim 5 wherein said variable reactive member is a variable-capacitance diode.

(References on following page)

References Cited in the file of this patent

UNITED STATES PATENTS 2,712,062 Frantz ---------------- June 28, 1955

OTHER REFERENCES

Journal of Applied Physics, vol. 29, No. 3, March 1958, page 594, "Parametric Amplification Using Low-Frequency Pumping," Bloom et al.

Reed: "The Variable-Capacitance Parametric Amplifier," Bell Laboratory Record, October 1959, pp. 373–379.

Nergaard: "Nonlinear-Capacitance Amplifiers," RCA Review, March 1959, pp. 3–17.